United States Patent Office 2,850,880
Patented Sept. 9, 1958

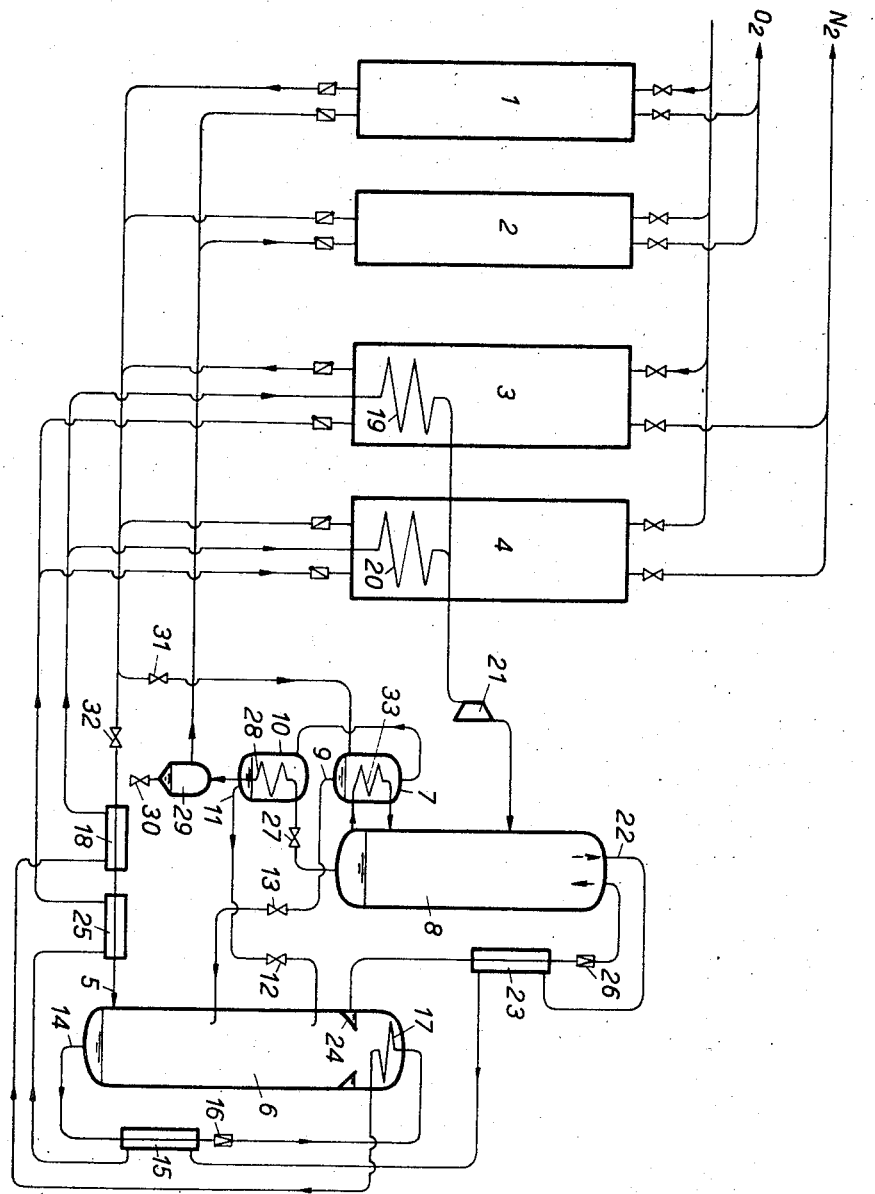

2,850,880

PROCESS AND AN APPARATUS FOR THE SEPARATION OF COMPRESSED AIR

Fritz Jakob, Pullach, Germany, assignor to Gesellschaft für Linde's Eismaschinen Aktiengesellschaft, Hollriegelskreuth, near Munich, Germany, a German company Application January 4, 1956, Serial No. 557,406

Claims priority, application Germany January 5, 1955

6 Claims. (Cl. 62—29)

The present invention relates to a process and an apparatus for the separation of compressed air.

Pure nitrogen condensing at the head of a high-pressure column, and obtained from the previous decomposition of air into impure oxygen and pure nitrogen has been used for heating pure oxygen boiling in a low-pressure column. Since the pure nitrogen was condensed in heat-exchange with pure oxygen evaporating at low pressure, a relatively higher pressure of nitrogen was necessary than if air had been used instead. However, all attempts to use air economically in this manner have failed, owing to the fact that the energy gain resulting from the lowering of pressure in the high-pressure column was cancelled out by a loss in the oxygen yield.

It is an object of the invention to achieve an energy gain of approximately 12% calculated on the oxygen produced without a corresponding loss in yield.

According to the invention, there is provided a process for the separation of compressed air, comprising the steps of cooling a stream of compressed air in heat-exchange with pure and impure gaseous oxygen and pure gaseous nitrogen produced by air-separation, dividing the cooled air stream into two substantially equal branches, condensing one branch, in heat-exchange with evaporating, substantially pure liquid oxygen from the bottom of a low-pressure column, into liquid fractions which are respesctively rich and poor in oxygen, condensing the remaining impurities from the substantially pure gaseous oxygen to form said pure gaseous oxygen, supplying the oxygen-rich and oxygen-poor fractions respectively to relatively low and high intermediate points in a high-pressure rectification column, introducing the other branch into said high-pressure rectification column near the bottom thereof, expanding part of the bottom liquid in the latter column, evaporating the expanded liquid in heat-exchange with condensing nitrogen at the top of said high-pressure column to form said impure gaseous oxygen, causing the latter to expand and perform work, after its heat-exchange with incoming air, washing the expanded gases in said low-pressure column with nitrogen washing liquid supplied from the top of said high-pressure column, and withdrawing said pure gaseous nitrogen from the top of said low-pressure column.

For a better understanding of the invention, and to show how the same is to be carried into effect, reference will now be made to the accompanying drawing, which shows diagrammatically one constructional form of an apparatus for carrying into effect a process for the separation of compressed air.

Air is cooled, on the one hand, in the oxygen regenerators 1 and 2, and in nitrogen regenerators 3 and 4. The air which is supplied to the regenerators at a pressure of approximately 4.3 atmospheres absolute pressure and discharged therefrom at a pressure of approximately 4.15 atmospheres absolute pressure, is divided up after the regenerators into two substantially equal branch currents. One branch current serves to heat pure oxygen in a low-pressure column 8, and the other branch current passes through two further counter-current heat-exchangers 18 and 25 and is introduced directly at 5 into a high-pressure column 6, in which the air is decomposed by rectification into impure oxygen and pure nitrogen. Both the high-pressure column and the low-pressure column are rectification columns of known construction, with rectification trays, which are not illustrated in the drawing.

Valves 31 and 32 divide the air stream into the two currents in the desired proportions. The branch used for heating the low-pressure column is partly condensed in a heat-exchanger 7 into a liquid fraction which is relatively rich in oxygen. The latter is tapped off at 9 and is introduced by way of a valve 13 into the high-pressure column, with a content of approximately 30% oxygen. The non-liquefied fraction passes into the second heat-exchanger 10 in which it is liquefied in heat-exchange with evaporating oxygen from the bottom of the low-pressure column. This bottom liquid passes through a valve 27, evaporator 28 and a separator 29 to the regenerators 1 and 2. The liquefied oxygen-poor fraction is drawn off from the heat-exchanger 10 at 11 by way of a valve 12 and is introduced into the high-pressure column 6 at a comparatively high intermediate point in the column.

The oxygen evaporating in the exchanger pipes 33 in the heat-exchanger 7 flows in the low-pressure column 8 in counter-current to washing nitrogen. The latter is brought to the liquid state in the head of the high-pressure column 6 in contact with an oxygen evaporator 17, and is collected in a channel 24. The liquid N is taken from the channel 24 cooled to low temperatures in an exchanger 23 in heat-exchange with gaseous nitrogen expanded in a valve 26 to the pressure of the low-pressure column, and introduced into the latter. The nitrogen in the low-pressure column is tapped off at 22 in the gaseous condition and conveyed by way of exchangers 23, 15 and 25 to the particular regenerator, e. g. regenerator 4, which is to be cooled with nitrogen. Regenerators 1, 2, 3 and 4 are changed over at regular intervals of time in the usual manner by means of the controlled change-over valves which are indicated at the top ends of the regenerators without any particular designations, or by means of the non-return valves indicated at the lower ends of the regenerators.

The impure oxygen produced in the high-pressure column by washing compressed air with re-condensed nitrogen is tapped off at 14, cooled to low temperatures in the exchanger 15, with gaseous nitrogen from the low-pressure column, expanded in a valve 16 to an intermediate pressure of 2.2 atmospheres absolute and evaporated under this pressure in the evaporator 17. The vapours pass through an exchanger 18, where they further precool the air fraction going to the high-pressure column, are heated in both branches of the pair of nitrogen regenerators 3, 4 inside exchangers 19 and 20 by a certain amount and are delivered to an expansion turbine 21. The impure oxygen expanded therein is blown into the low-pressure column 8 at a point appropriate to its composition. The expansion from 2.2 to approximately 1.3 atmospheres with the production of useful work is sufficient to generate the cold required for the decomposition operation. Before the pure oxygen which is produced passes the pair of regenerators 2, it passes through a separator 29 where a certain evaporated residue is is drawn off at 30 in order to remove the acetylene.

Thus, the success of the process just described is essentially achieved by the combination of the following features: heating the pure oxygen with an air fraction, evaporating the impure oxygen at an intermediate pressure in order to produce washing nitrogen, and finally blowing into the low-pressure column the evaporating impure oxygen fraction—after it has been expanded to produce useful work.

Instead of the one air fraction being condensed in the two exchangers 7 and 10, it is also possible to carry out condensation in a single exchanger, it being merely necessary to draw off the liquid which is formed at different heights of the exchanger, so that the washing liquids can be supplied to the pressure column in the particular composition which is required.

I claim:

1. A process for the separation of compressed air, comprising the steps of cooling a stream of compressed air in heat-exchange with pure and impure gaseous oxygen and pure gaseous nitrogen produced by air-separation, dividing the cooled air stream into two substantially equal branches, condensing one branch into liquid fractions which are respectively rich and poor in oxygen, in heat-exchange with evaporating, substantially pure liquid oxygen from the bottom of a low-pressure column, separating condensed impurities from the evaporating liquid oxygen to form said pure gaseous oxygen, supplying the oxygen-rich and oxygen-poor fractions respectively to relatively low and high intermediate points in a high-pressure rectification column, introducing the other branch into said high-pressure rectification column near the bottom thereof, expanding part of the bottom liquid in the latter column, evaporating the expanded liquid in heat-exchange with condensing nitrogen at the top of said high-pressure column to form said impure gaseous oxygen, causing the latter to expand and perform work, after its heat-exchange with incoming air, supplying the expanded impure oxygen gases to said low-pressure column, feeding nitrogen washing liquid from the top of said high-pressure column to said low-pressure column, and withdrawing said pure gaseous nitrogen from the top of said low-pressure column.

2. A process according to claim 1, further comprising the step of cooling said bottom liquid in heat-exchange with said pure gaseous nitrogen.

3. A process according to claim 1, wherein said oxygen-rich and oxygen-poor fractions are successively condensed from said one branch in two stages, the non-liquefied remainder from the first stage being supplied to the second stage.

4. A process according to claim 1, in which the compressed air stream is at a pressure of about 4 atmospheres, said oxygen-rich fraction is introduced into the high-pressure column with an oxygen content of about 30%, said bottom liquid is expanded to a pressure of about 2.2 atmospheres, and said impure gaseous oxygen is expanded to a pressure of about 1.3 atmospheres before being supplied to an intermediate point in the low-pressure rectification column.

5. Apparatus for the separation of compressed air, comprising a low-pressure column for producing pure oxygen by washing expanded, impure oxygen with a pure nitrogen washing liquid, a high-pressure column for separating cold compressed air supplied thereto into pure nitrogen and impure oxygen, collecting means within said high-pressure column near the top thereof for receiving the pure nitrogen washing liquid supplied to said low-pressure column, an evaporator within said high-pressure column at about the top thereof for evaporating impure oxygen supplied from the bottom of said high-pressure column, valve means for separating a stream of cold compressed air into two branches condensing means for separating from one branch of said stream oxygen-rich and oxygen-poor fractions and supplying the latter fractions respectively to relatively low and relatively high intermediate points within said high-pressure column, evaporating means within said condensing means for evaporating substantially pure liquid oxygen withdrawn from the bottom of said low-pressure column, conduit means for supplying the other branch of said stream to said high-pressure column at a location near the bottom thereof, heat-exchangers for cooling the in-coming air-stream in heat-exchange with pure gaseous nitrogen supplied from the top of said low-pressure column, and in heat-exchange with pure gaseous oxygen supplied by said evaporating means and impure gaseous oxygen supplied by said evaporator, and a turbine for expanding said impure gaseous oxygen after its heat-exchange with incoming air and for supplying the heated, expanded gases to an intermediate point in said low-pressure column.

6. A process according to claim 1, and further comprising the step of warming the impure gaseous oxygen in heat-exchange with said other branch before said impure gaseous oxygen is brought into heat-exchange with the incoming compressed air.

References Cited in the file of this patent

UNITED STATES PATENTS

| | | |
|---|---|---|
| 2,040,107 | Schlitt | May 12, 1936 |
| 2,209,748 | Schlitt | July 30, 1940 |
| 2,411,680 | Dennis | Nov. 26, 1946 |
| 2,527,301 | Fausek | Oct. 24, 1950 |
| 2,537,046 | Garbo | Jan. 9, 1951 |
| 2,650,482 | Lobo | Sept. 1, 1953 |
| 2,655,796 | Rice | Oct. 20, 1953 |
| 2,664,719 | Rice | Jan. 5, 1954 |
| 2,753,698 | Jakob | July 10, 1956 |

FOREIGN PATENTS

| | | |
|---|---|---|
| 1,072,169 | France | Mar. 10, 1954 |

OTHER REFERENCES

Gas Liquefaction and Rectification, Mansel Davies, 1949, p. 123.